Feb. 22, 1949. A. GAZDA 2,462,381
SPRING HANDLE BAR FOR MOTOR CYCLES AND THE LIKE
Filed Nov. 1, 1945
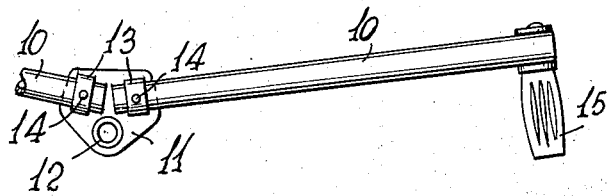
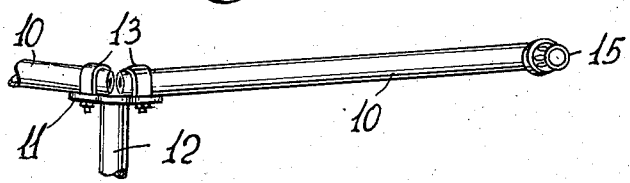
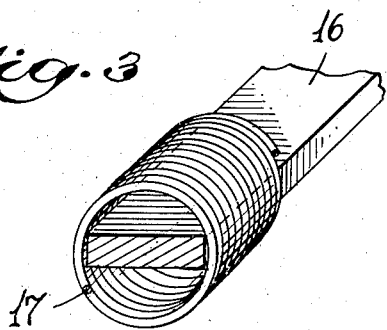
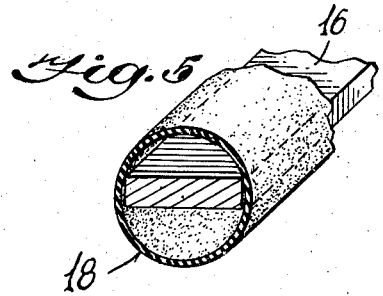
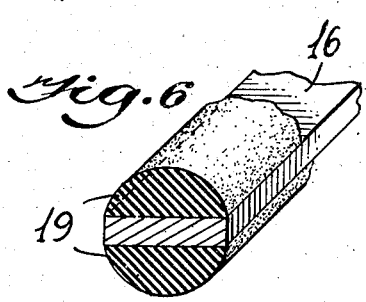
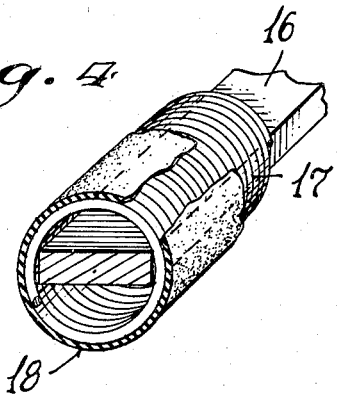
Inventor
Antoine Gazda,
By E. F. Ofenderoth
Attorney Patented Feb. 22, 1949

2,462,381

UNITED STATES PATENT OFFICE 2,462,381

SPRING HANDLE BAR FOR MOTORCYCLES AND THE LIKE

Antoine Gazda, Providence, R. I.

Application November 1, 1945, Serial No. 626,058

5 Claims. (Cl. 74—551.2)

The present invention relates to an improved handle bar for cycles or motor cycles.

In driving a cycle or motor cycle or the like, the operator is subject to the transmission to his body, via the handle bar of the vehicle, of shocks and vibrations. It is manifestly desirable to eliminate or to minimize as far as possible the transmission of such vibrations and shocks.

A primary object of the present invention is the embodiment of a handle bar construction, particularly adapted for cycles and the like, for substantially eliminating the shocks and vibrations transmitted to the arms and body of the handle bar operator or for reducing to a very large extent the magnitude of such shocks and vibrations. To this end, briefly stated, the handle bar construction according to the present invention consists of a relationship of parts which is resilient in character, preferably comprising a main leaf spring of steel or other suitable material, allowing flexibility in one direction only, i. e., in a vertical direction parallel to the longitudinal axis of the upright shank of the front wheel of the cycle.

A further object of the invention is the realization of a handle bar construction of the above type and of simplified character, whereby the desired results may be accomplished with a minimum number of parts.

Illustrative modes of carrying out the present invention are shown by way of example on the accompanying sheet of drawings, on which:

Fig. 1 is a fragmentary top plan view of a handle bar construction according to the present invention;

Fig. 2 is a fragmentary front view of the construction according to Fig. 1;

Fig. 3 is a fragmentary perspective view, on a relatively enlarged scale, showing the details of the handle bar construction according to one embodiment of the invention;

Fig. 4 is a fragmentary perspective view showing the detailed construction of a second embodiment;

Fig. 5 is a similar view showing a third embodiment; and

Fig. 6 is a similar view showing still another form of handle bar according to the invention.

Figs. 1 and 2 illustrate the general relationship of parts. The handle bar, represented generally by numeral 10, is supported by the holder 11 integrally provided at the upper end of the conventional shank 12 of the front wheel of the cycle to which the invention is applied. The inner end of each handle bar 10 is secured to the holder 11, for instance, with the aid of clamping yokes 13 or in any other convenient manner. Bolt means 14, extending through the handle bar and holder, are also provided. Grips 15 are secured in any suitable and conventional manner to the free ends of the bars.

As shown in Fig. 3, the resilient handle bar 10 is constituted essentially by a leaf spring 16 of suitable resilient material, such as spring steel or the like, and of a thickness which may vary according to the desired degree of oscillation of the handle. This single flat spring 16 is covered or encompassed by a spiral spring 17 of tubular configuration. Spring 17 is also made of any suitable material, such as springy steel wire, and the convolutions thereof are preferably in contact with each other to form what is in effect a spring tube. The fit between the flat spring 16 and the spiral tube 17 is a friction fit. To an extent essentially coextensive with the extent of the clamping yokes 13, the spaces between the spring 16 and the spring 17 may be filled with correspondingly configured blocks of wood or metal or the like (not shown) through which, of course, bolt means 14 will extend. Spring 17 may terminate short of the free end of spring 16 so that the latter may provide a simple projecting end to which a grip 15 may be readily attached.

According to Fig. 4, the resilient handle 10 is comprised of a single flat spring 16 encompassed by a spiral spring 17, as in the previously described embodiment. However, the spiral spring 17 is, in turn, covered by a thin resilient (rubber or the like) tube 18 tightly fitted thereon.

According to Fig. 5, the spiral spring 17 is omitted and the tube 18 is mounted directly on the flat spring 16. As in the case of Fig. 3, the spaces between the tube 18 and spring 16 are filled with solid material coextensively with clamping yokes 13.

According to Fig. 6, the resilient handle is comprised of a flat spring 16 covered on each side by solid resilient material 19 (rubber or the like) integrated in any known manner with the spring 16, the parts being configured as shown in Fig. 5 to constitute a cylindrical structure. The material 19 has sufficient flow characteristics to yield when the handle flexes in operation.

Having thus disclosed the invention, what is claimed is:

1. A resilient handle bar for motor cycles and the like comprising a flat spring, resilient means arranged on two sides thereof in contact therewith and yieldably connected to said sides, holder means for said handle bar adapted for attachment to the upper end of the front wheel shank of a motor cycle, and means for securing said spring and said resilient means to each other and to said holder means.

2. A resilient handle bar for motor cycles and the like comprising a flat spring, a spiral spring in tubular shape substantially encompassing said flat spring, the inner surface of said spiral spring being juxtaposed to said flat spring in frictional contact therewith, and means for securing said flat spring and spiral spring to each other and to a handle bar holder at the upper end of the front wheel shank of a motor cycle.

3. A resilient handle bar for motor cycles and the like comprising a flat spring, a resilient tube substantially encompassing said flat spring, the inner surface of said resilient tube being juxtaposed to said flat spring in frictional contact therewith, and means for securing said flat spring and resilient tube to each other and to a handle bar holder at the upper end of the front wheel shank of a motor cycle.

4. A resilient handle bar for motor cycles and the like comprising a flat spring, a layer of solid resilient material secured to each side thereof, the configuration of the several parts being such as jointly to define a cylinder.

5. A resilient handle bar for motor cycles and the like comprising a flat spring, a spiral spring in tubular shape substantially encompassing said flat spring, the inner surface of said spiral spring being juxtaposed to said flat spring and in frictional contact therewith, a resilient tube substantially encompassing said spiral spring in tight relationship therewith, and means for securing said flat spring, spiral spring, and resilient tube to each other and to a handle bar holder at the upper end of the front wheel shank of a motor cycle.

ANTOINE GAZDA.

REFERENCES CITED

The following references are of record in the file of this patent:

UNITED STATES PATENTS

| Number | Name | Date |
| --- | --- | --- |
| 581,301 | O'Brien | Apr. 27, 1897 |
| 1,719,007 | Gazda | July 2, 1929 |
| 2,176,692 | Snell | Oct. 17, 1939 |
| 2,439,636 | Saracchi | Apr. 13, 1948 |

FOREIGN PATENTS

| Number | Country | Date |
| --- | --- | --- |
| 710,784 | France | Aug. 28, 1931 |
| 536,245 | Germany | Oct. 22, 1931 |